No. 808,743. PATENTED JAN. 2, 1906.
W. L. HART.
CHURN DASHER.
APPLICATION FILED JUNE 27, 1904.
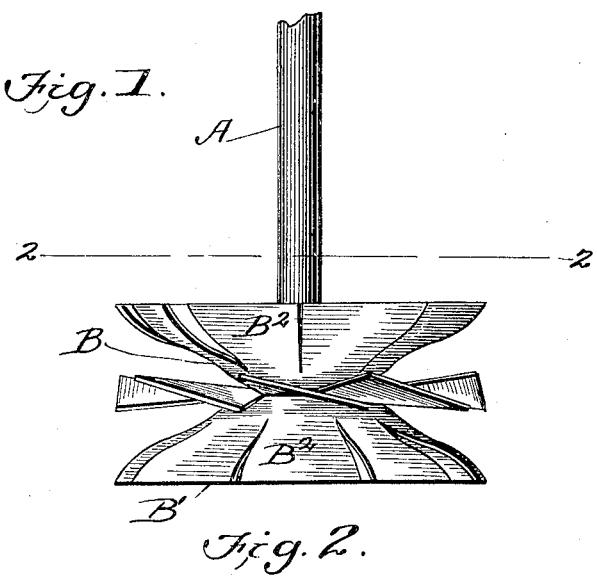
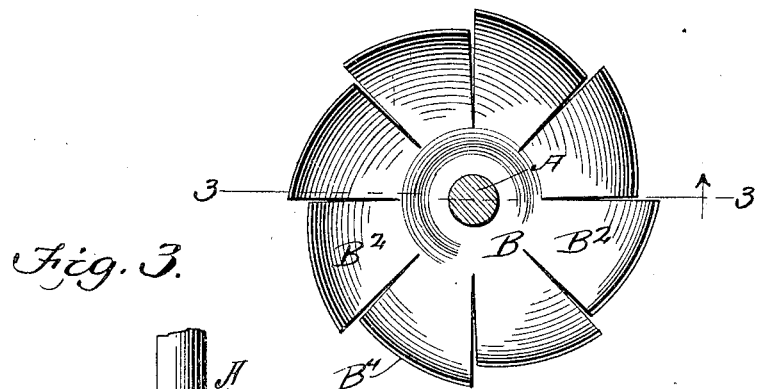
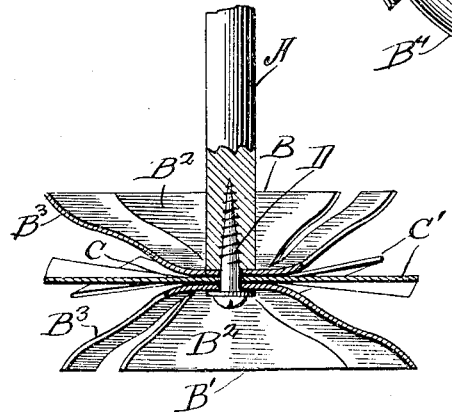
Witnesses
M. D. Blondell.
E. B. McBath.
Inventor
W. L. Hart.
By Mead & Brock
Attorneys

UNITED STATES PATENT OFFICE.

WILLIAM L. HART, OF MANSFIELD, MISSOURI, ASSIGNOR OF ONE-HALF TO J. E. HART, OF MANSFIELD, MISSOURI.

CHURN-DASHER.

No. 808,743.      Specification of Letters Patent.      Patented Jan. 2, 1906.

Application filed June 27, 1904. Serial No. 214,329.

*To all whom it may concern:*

Be it known that I, WILLIAM L. HART, a citizen of the United States, residing at Mansfield, in the county of Wright and State of Missouri, have invented a new and useful Churn-Dasher, of which the following is a specification.

This invention relates to improvements in churn-dashers adapted to be rotatably carried by a vertically-reciprocating dasher-rod and to rotate in opposite directions; and a further object is to aerate the cream and to construct a dasher which will throw the cream forcibly against the sides of the churn.

The invention consists of the novel features of construction hereinafter described, particularly pointed out in the claims, and shown in the accompanying drawings, in which—

Figure 1 is a vertical elevation of my dasher. Fig. 2 is a section on the line 2 2 of Fig. 1, showing a plan view of the upper dasher. Fig. 3 is a section on the line 3 3 of Fig. 2.

In the drawings, A represents the churn-dasher rod, and B and B' dashers of similar construction, but oppositely arranged upon the rod A, and a description of one will suffice for the other. These dashers are preferably formed of sheet metal, being formed of circular disks radially slotted and crimped cup shape, the slots forming a plurality of wings or blades $B^2$ on each of the dashers B and B'. As shown at $B^3$ in Fig. 3, these wings $B^2$ are bent outwardly on a compound curve, and they are also given a radial torsional twist, as is most clearly shown in Fig. 2 at $B^4$. In arranging them upon the dasher-rod A the upper dasher B is placed in position with the wings $B^2$ pointing upwardly and the lower dasher B' with the wings $B^2$ pointing downwardly. Between these dashers is a third dasher C, slotted to form a plurality of blades C', the said blades being inclined, as shown in Figs. 1 and 3. The dashers are held in place by a suitable screw D, inserted into the lower end of the rod A. It will be noted that by reason of the cup-like shape given the dashers B and B' the dasher C will rotate freely between them without the employment of a hub to space apart the wings of the upper and lower dashers.

By means of the construction herein described the butter is collected rapidly and the separation of the fat from the cream is thorough and accomplished with comparative ease.

Having thus fully described my invention, what I claim, and desire to secure by Letters Patent, is—

1. A device of the kind described comprising a dasher-rod, winged, cup-shaped dashers carried by the said rod, the wings of the upper dasher extending upwardly, and those of the lower dasher downwardly, and a dasher having inclined blades arranged on the rod between the cup-shaped dashers.

2. The combination with a dasher-rod, of oppositely-arranged cup-shaped dashers, having wings formed with a radial torsional twist, said dashers being arranged in vertical alinement, the upper dasher rotates in one direction on a downstroke and in an opposite direction on the upstroke and the lower dasher rotates in an opposite direction on an upstroke to what it does on a downstroke, and a dasher having inclined blades arranged between the first-mentioned dashers and adapted to rotate in reverse direction of the up and down strokes, respectively.

3. The combination with a dasher-rod, of oppositely-arranged cup-shaped dashers having wings formed with a radial torsional twist, said dashers being secured to the end of the said rod in vertical alinement by a screw passing through the openings in the dashers, the dashers rotating in reverse directions on their up and down strokes, and a dasher having inclined blades arranged between said dashers on the screw and adapted to rotate in reverse directions of the up and down stroke, respectively.

WILLIAM L. HART.

Witnesses:
F. M. YOUNG,
A. P. POOL.